US006682655B2

(12) United States Patent
Beckham et al.

(10) Patent No.: US 6,682,655 B2
(45) Date of Patent: Jan. 27, 2004

(54) CONCRETE RECOVERY SYSTEM

(75) Inventors: David James Beckham, Vancouver (CA); Alan Joseph Lowe, Vancouver (CA); Michael John Fullam, White Rock (CA)

(73) Assignee: Knelson Patents Inc., Langley (CA)

( * ) Notice: Subject to any disclaimer, the term of this patent is extended or adjusted under 35 U.S.C. 154(b) by 0 days.

(21) Appl. No.: 09/962,619

(22) Filed: Sep. 26, 2001

(65) Prior Publication Data

US 2002/0108537 A1 Aug. 15, 2002

Related U.S. Application Data

(60) Provisional application No. 60/268,082, filed on Feb. 13, 2001.

(51) Int. Cl.[7] .................................................. C02F 1/00
(52) U.S. Cl. ........................ 210/740; 210/712; 210/723; 210/738
(58) Field of Search ................................. 210/740, 712, 210/723, 738

(56) References Cited

U.S. PATENT DOCUMENTS 4,127,478 A * 11/1978 Miller ......................... 209/240
4,154,671 A * 5/1979 Borges ......................... 209/10
4,192,745 A * 3/1980 Hood ........................... 210/66
5,695,280 A   12/1997 Baker et al.

FOREIGN PATENT DOCUMENTS

| JP | 10180238 | 7/1998 |
| JP | 10296714 | 10/1998 |
| WO | WO02/06024 | 1/2002 |

OTHER PUBLICATIONS

"Study on re–use of returned concrete" Okawa et al. Konkurito Kogaku Ronbunshu (1997), 8(2), 31–37.*
"Characteristics of concrete using recycled powder From demolished concrete" Nakata et al. Senento, Konkurito Ronbunshi (1995), 49, 354–9.*

* cited by examiner

*Primary Examiner*—Paul Marcantoni
(74) *Attorney, Agent, or Firm*—Adrian D. Battison; Michael R. Williams; Ryan W. Dupuis

(57) ABSTRACT

A method for recovering usable material from waste concrete is herein described. Specifically, waste concrete is mixed with water containing hydration stabilization admixtures, forming an aggregate slurry. The aggregates are then removed from the slurry for recycling. The slurry itself is then used for mixing with additional waste concrete, during which time the density of the slurry is monitored and action taken to ensure that the density of the slurry remains within acceptable parameters. The slurry is then used in place of fresh water when preparing subsequent batches of concrete.

13 Claims, 4 Drawing Sheets

CONCRETE RECOVERY SYSTEM

This application claims priority under 35 U.S.C. 119 from Provisional Application Serial No. 60/268,082 filed Feb. 13, 2001.

FIELD OF THE INVENTION

The present invention relates generally to the field of concrete manufacture and more particularly to the field of recovery methods for recycling hydrated cement from returned concrete.

BACKGROUND OF THE INVENTION

Over the past decade, governments and environmental groups have increased pressure on the ready-mix industry to reduce waste discharge. The high-pH, toxic, alkaline run-off caused by waste cement is now classified as a hazardous waste in some parts of the world and it is expected that the U.S. and Canada will soon mandate zero-discharge regulations for its ready-mix industry.

The problem is caused by hydrated cement, which contains Calcium Hydroxide-($Ca(OH)_2$), the highly alkaline substance that acts as the binary agent in concrete. When $Ca(OH)_2$ is released into the environment, it can be deadly to fish and wildlife and can potentially poison other public waterways. $Ca(OH)_2$ created by concrete production routinely exceeds the maximum allowed discharge pH levels for most civic process discharge permits.

Conversely, if recycled into fresh concrete without treatment, $Ca(OH)_2$ can cause poor slump control, reduced strength and unpredictable finishing characteristics. Once cement is exposed to water and hydration begins, it must continue until the process is exhausted or suspended. The longer the hydration period, the greater amount of $Ca(OH)_2$ produced.

In recent years, chemical admixture producers have developed hydration stabilization admixtures (HSA), which have provided the solution to the hydration problem of the cement. Since it is now possible to suspend hydration for a controlled period of time (stabilize), partially hydrated cement can be recycled before it entirely converts to calcium hydroxide through hydration. This also means that a portion of the cementitious value can be saved for later use.

Conventionally when a concrete mixer truck returns to the plant after delivering a load, there is almost always unused concrete and/or residue accumulated on the inside of the truck drum and chutes. The system delivers chemically treated system-water to the truck drum to suspend hydration and dilute and rinse the drum contents into the close-circuit reclamation and recycling system.

The process of hydration stabilization can be found in a technical document named "A Novel Method Of Recycling Concrete Using Extended Life Admixtures." Co-authored by Lawrence R. Roberts of W. R. Grace (Conn.) and Seiji Nakamura of K.K. Denka Japan, which was released at the European Ready-Mix Association congress in 1998, the disclosure of which is incorporated herein by reference.

The term system-water may, throughout this document, also be referred to as wash-water, washout fluid, slurry and batch slurry. It should also be noted, that throughout the course of this process description, when the system transfers slurry from the recovery tank to the secondary tank, the nomenclature used to describe the slurry will change from "system-water" to "batch slurry". This is intended to clearly define the difference in the intended purpose of the slurry in each part of the process. The sand and gravel are classified out of the drum contents using, for example, a spiral-classifier re-claimer, while the cement and very fine sand report to the primary tank with the circulating system-water.

SUMMARY OF THE INVENTION

It is one object of the present invention to provide an improved method for re-claiming and recycling cement into concrete production.

According to the invention, there is provided a method of recycling waste unset concrete materials containing water, aggregates and partially hydrated cement, the method comprising:

providing a recovery tank;

introducing into the recovery tank water and hydration stabilization chemicals to provide a washout fluid including same;

providing a plurality of transit mixer drums, each containing a quantity of waste concrete;

for each transit mixer drum;

transferring from the recovery tank a quantity of the washout fluid from the recovery tank into each transit mixer drum;

mixing the waste concrete in the transit mixer drum and the washout fluid, thereby forming an aggregate slurry;

transferring the aggregate slurry into an aggregate re-claimer so as to separate the aggregate slurry into aggregates and slurry;

and transferring the slurry to the recovery tank;

providing a slurry supply system for supplying the batch slurry to a concrete batching plant for use of the batch slurry in mixing with aggregates and cement to form fresh concrete in the batching plant;

and transferring the batch slurry from the recovery tank to the slurry supply system for use of the batch slurry.

According to one important feature of the invention, the slurry is transferred from the recovery tank to the slurry supply system for use of the slurry as the batch slurry at a predetermined constant density. This allows the batcher to receive batch slurry at a constant condition ensuring that it can be utilized in predetermined batch mixes utilizing the known and constant parameters of the slurry Preferably the system-water from the recovery tank is mixed with dilution water to reduce a density of the system-water from the recovery tank to the predetermined constant density.

In one arrangement, after dilution the diluted system-water is stored in a secondary tank from which smaller individual batches are drawn as batch slurry for the batch slurry supply system.

Preferably the system-water from the recovery tank is mixed with dilution water in a transfer duct as it is being transferred between the recovery tank and the secondary tank.

In another arrangement, the system-water from the recovery tank is mixed with dilution water in a transfer duct as it is being transferred to the slurry supply system so that it is stored at an elevated density and diluted only when required at the batching plant.

Preferably the density of the slurry is measured while it is in the duct and a rate of supply of the dilution water is increased until the required density is reached whereupon the rate of supply of dilution water is maintained constant. In this arrangement, information can be stored defining the rate of supply for subsequent transfer of system-water so that the required adjustment can be achieved more quickly.

In order to transfer only batch slurry at the required density, the batch slurry is returned to the recovery tank until the required density is reached.

In accordance with another important feature of the invention, the water and hydration stabilization chemicals are introduced simultaneously into the recovery tank at a predetermined calculated ratio.

Preferably the predetermined ratio is determined based upon a target density for the system-water in the recovery tank and preferably all the water and hydration stabilization chemicals are introduced at that set ratio while the density is at or below the target density. This allows a simple calculation and adjustment and control of the supply in that all materials are supplied at that same ratio which is determined by the target or intended density value even though the density may to reach that target until a number of recoveries have been made, following which the density is controlled by addition of further water and chemicals at the same ratio. For example, in order to keep cement hydration suspended for a period of 48 to 72 hours at a target density of 1.15 g/cm$^3$ (20% solids by mass), HSA will need to be added to the water at a ratio of 0.002:1 or 2.00 liters of HSA for each 1000 liters of water. If, alternatively, the density was 1.07 g/cm$^3$ (10% solids by mass), the amount of HSA would change to 0.0015:1 or 1.5 liters of HSA for each 1000 liters of water. These ratios will be scaled in accordance with temperature variations in the system-water.

In order to maintain that target density, the density of the system-water is repeatedly measured and additional water and chemicals at the same set ratio are added when the density exceeds the target density to dilute the system-water to said target density.

The ratio may be calculated including as a calculation factor the temperature of the system-water in the recovery tank and heating and/or cooling may be applied to the system-water to maintain the system-water at said temperature.

In the event that the recovery tank is filled to capacity and the target density is exceeded to an over density, additional chemicals are added without additional water to provide a quantity of chemicals sufficient for said over density.

In accordance with another important feature of the invention, there is provided a sleep mode in which the slurry is to be left in storage for a period of time greater than a working period, in which mode additional chemicals are added without additional water at an amount dependent upon the time period beyond the working period. For example, if the density rises to 1.20 g/cm$^3$ (14% solids by mass), chemical will be added according to the density based on the assumption that the tank is full and the chemical must be added in ratio to that full volume. Up to and including a density of 1.30 g/cm$^3$ (35% solids by mass) the system will add chemical at incremental intervals of one unit of specific gravity across the entire volume of the recovery tank.

The slurry supply system may include a batch tank dimensioned to receive and store a batch of the batch slurry substantially equal to or greater than a required batch for the batch plant.

It is advantageous if the batch tank has a discharge for supply to the batch plant which discharges the slurry at a rate greater than a rate of supply thereto so that the batch can be discharged rapidly into the batch plant for use while the batch tank can be re-filled more slowly using the transfer pump from the secondary tank to the batch tank.

Preferably the secondary tank is dimensioned to hold a quantity of the batch slurry equal to or greater than a series of batches of the batch tank for use of the batch tank repeatedly during a work period, for example one shift or one day, and wherein the secondary tank is filled with the required amount of diluted slurry from the recovery tank for that period. For example, if the batcher requires 125 liters per cubic meter of concrete, and he must batch 300 cubic meters over the course of a work period, then he will need to transfer 37,500 liters of batch slurry to the secondary tank during the work period to fulfill that requirement.

Preferably the batch slurry is stored at a temperature lower than a required temperature for the concrete batching plant and is mixed with hot water to raise the temperature to the required temperature at or prior to the batching plant. In this arrangement the batch slurry can be diluted with hot water to effect heating to the required temperature and to effect reduction in density to the required density.

BRIEF DESCRIPTION OF THE DRAWINGS

Two embodiment of the invention will now be described in conjunction with the accompanying drawings in which.

DESCRIPTION OF THE PREFERRED EMBODIMENTS

Figure 1:
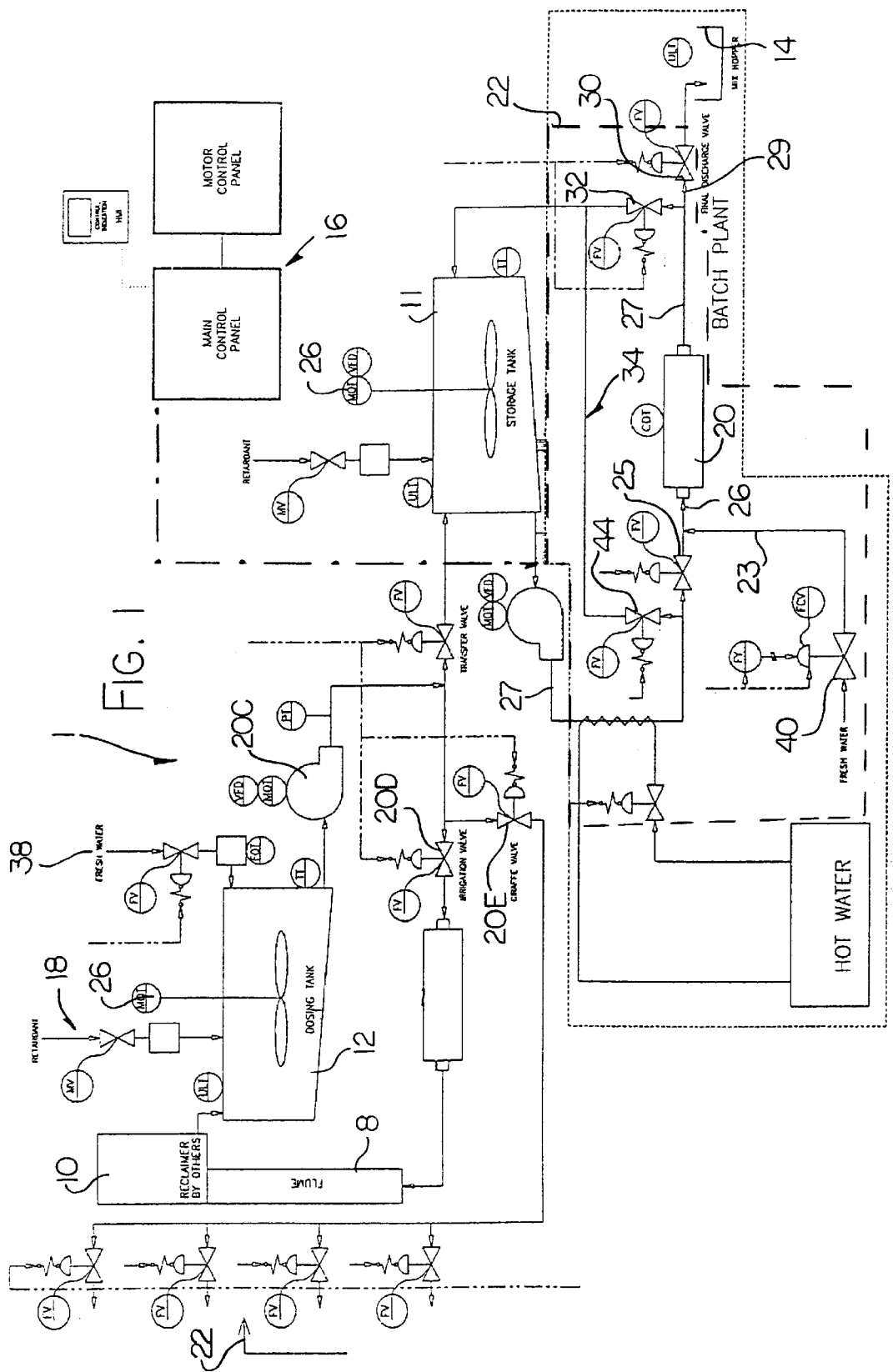
FIG. 1 is a schematic diagram of a first embodiment of the concrete recovery system.
Figure 2:
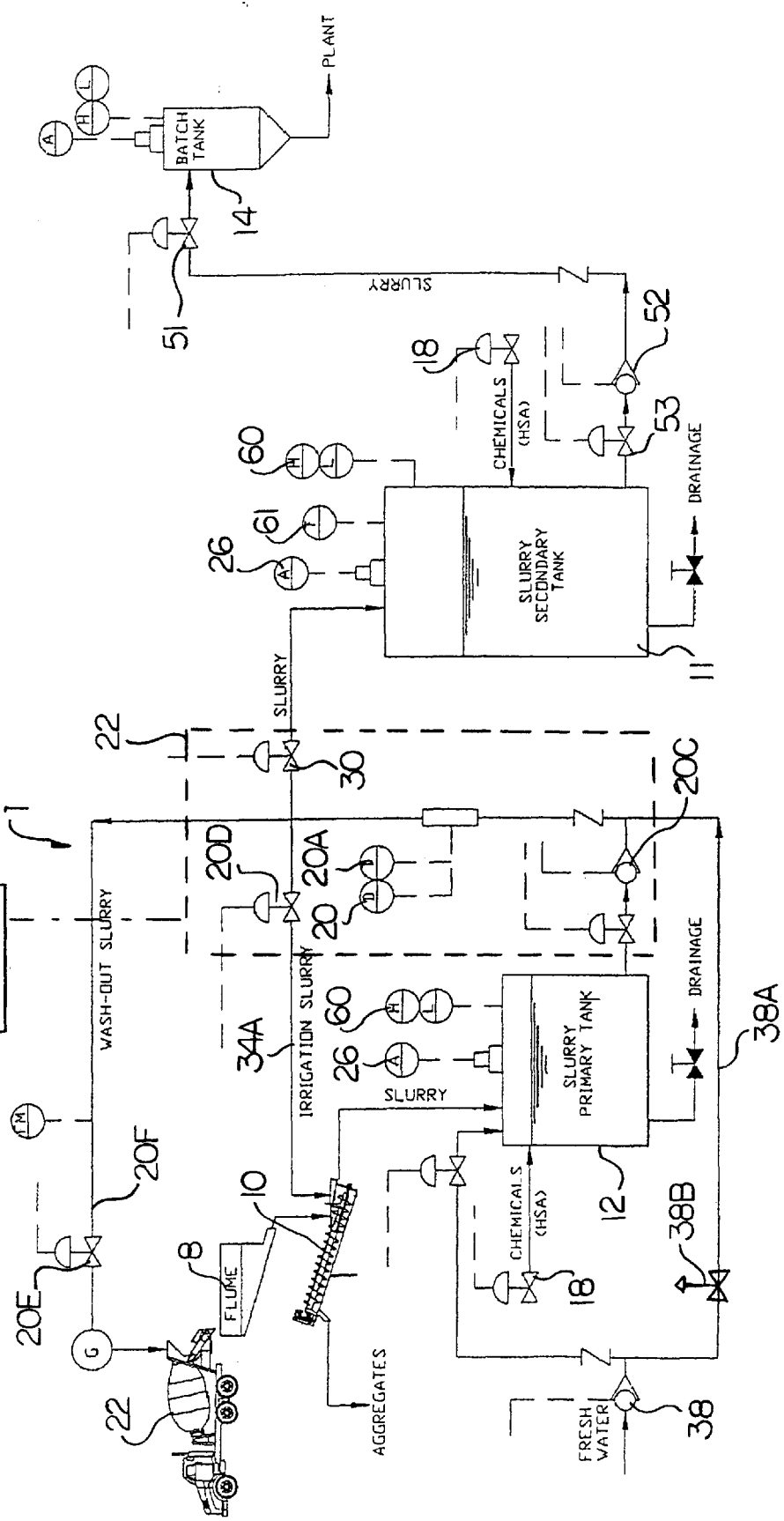
FIG. 2 is a schematic diagram of a second embodiment of the concrete recovery system.
Figure 3:
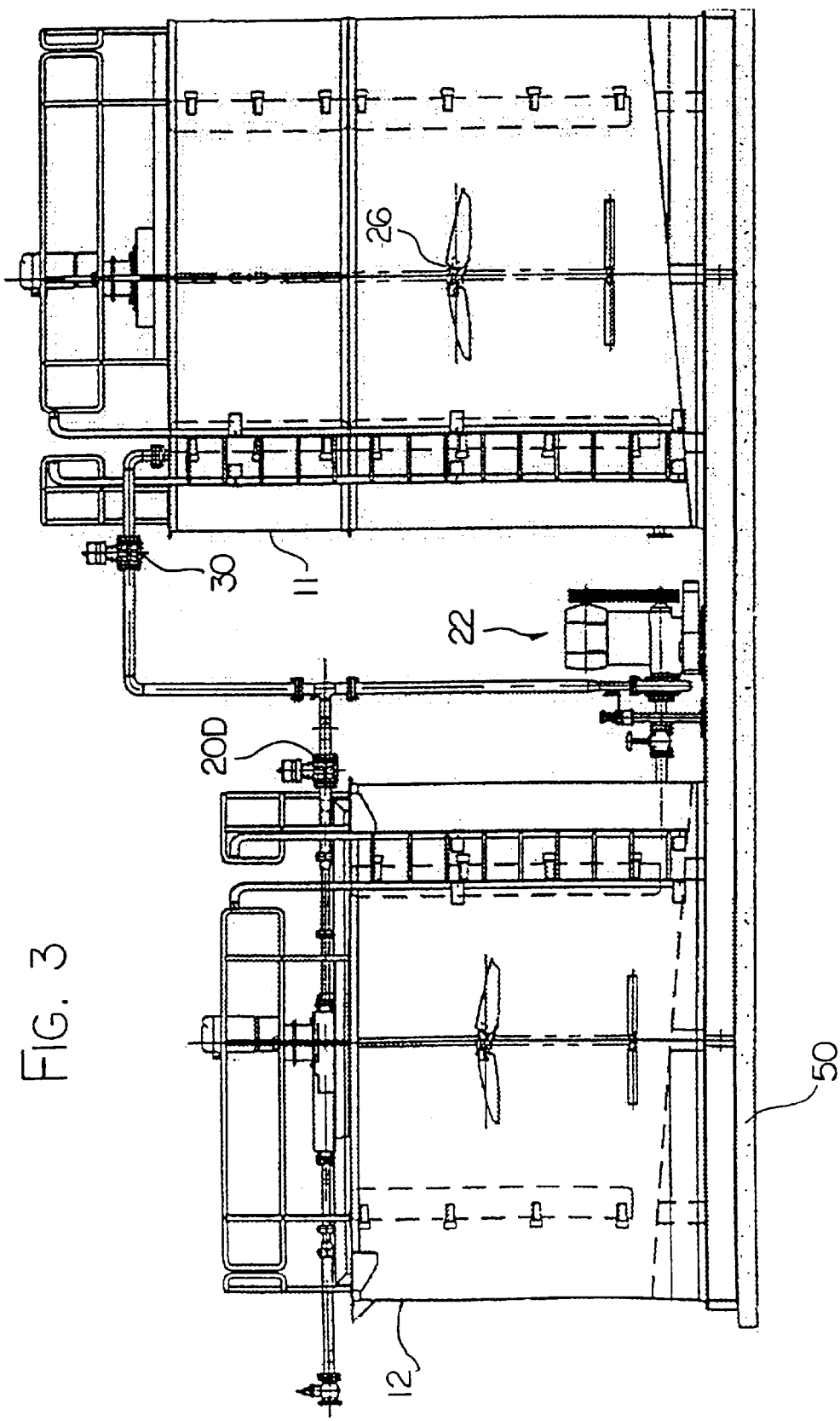
FIG. 3 is a side elevational view of the concrete recovery system showing the arrangement of the components.
Figure 4:
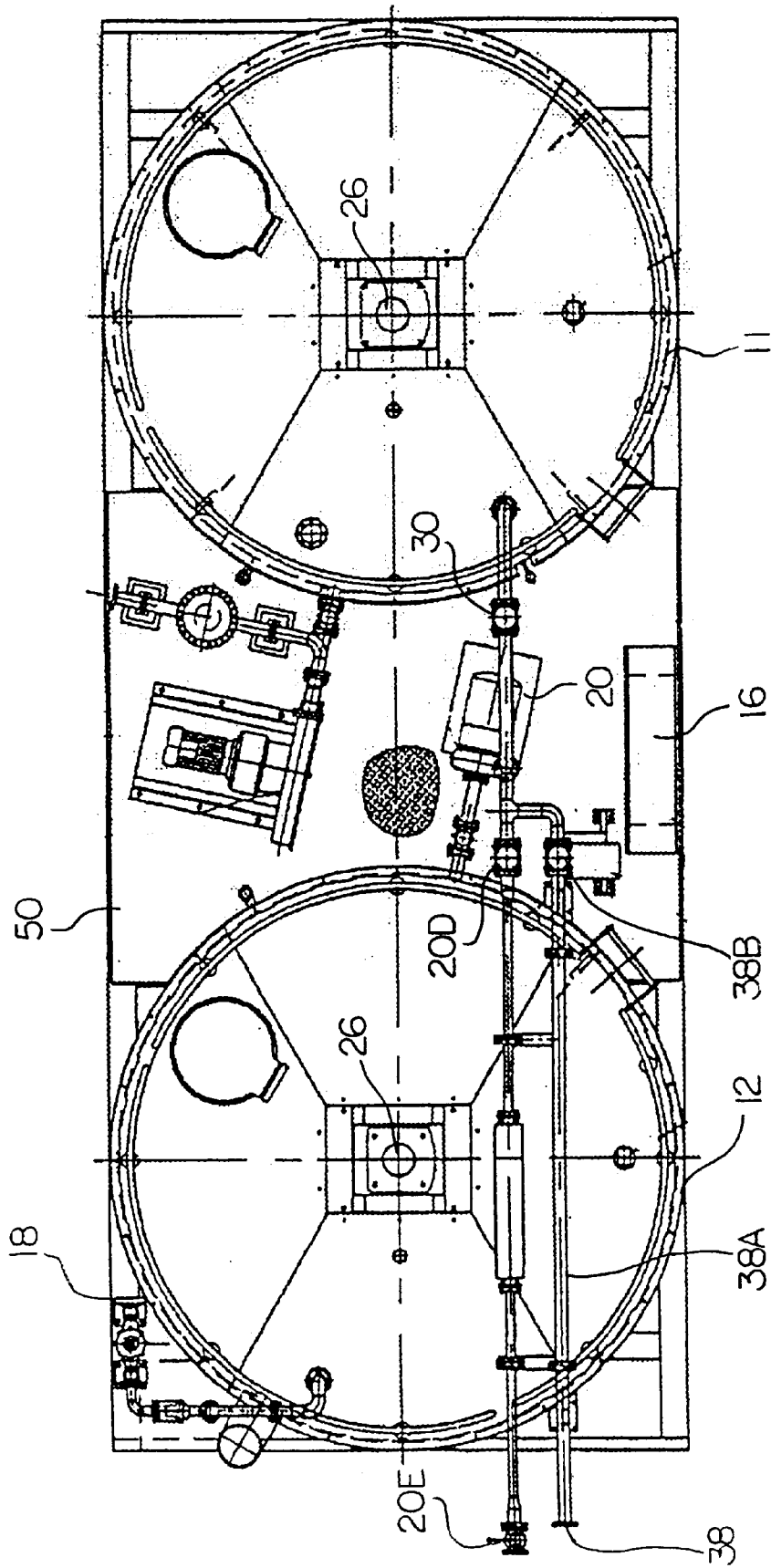
FIG. 4 is a top plan view of the concrete recovery system showing the arrangement of the components.

The embodiments shown in FIGS. 1 and 2 includes a concrete recovery system 1 comprises: a conventional flume 8, a conventional aggregate re-claimer 10, a recovery tank 12, a secondary tank 11, a batch tank 14, a control unit 16 including a dilution management assembly 22, a chemical supply 18 and a batch water supply 38.

The aggregate re-claimer 10 separates waste concrete mixture into aggregate material and slurry. In some embodiments, the aggregate re-claimer 10 may be, for example, a gravity screw or trommel re-claimer with a de-watering weir and screw and may include the rinse flume 8, as described below. Other suitable arrangements may also be used, according to the manner in which the user wishes to recover aggregates. In some embodiments, the aggregate re-claimer 10 recovers aggregate to 150 microns or #100 mesh in size or smaller.

The recovery tank 12 holds system-water and is connected to the aggregate re-claimer 10 for supplying washing fluid for removing waste concrete, as described below. As described below, at the start of each cycle, the recovery tank holds water containing a hydration stabilization admixture (HSA). Initially, this mixture circulates through the aggregate re-claimer 10, acting as washout water, as described below. As trucks wash out, a density meter 20 and a temperature monitor 20B in a discharge line 20A regularly monitors the density of the resulting system-water circulating from the tank 12 through the discharge pump 20C and an irrigation valve 20D. Over the course of the day, as the density of the system-water rises, the control unit 16 adds more fresh water from supply 38 and HSA from supply 18 in order to maintain a target slurry density, as described below. In some embodiments, the solids in the system-water are kept in suspension in the recovery tank 12 with an impeller agitator 24.

The secondary tank 14 stores the batch slurry for use in the preparation of concrete. Specifically, system-water accumulated in the recovery tank 12 is pump-transferred to the secondary tank 11 for temporary storage until it can be re-used as batch slurry for mixing water in fresh concrete batches. In use, the batch slurry in the secondary tank 11 is transferred to batch tank 14 at the batch plant at the request of the batcher or system. In some embodiments, the recovery tank and the secondary tank 11 may each include an agitator 26, for example, an impeller agitator for keeping the slurry in suspension. In the first embodiment described herein, the batch slurry in the secondary tank 14 is transferred from the recovery tank at the same target density where it is stored at an elevated density of between 1.07 and 1.30 g/cm$^3$.

To effect transfer, the irrigation valve 20D and the giraffe valve 20E are closed and a transfer valve 20F is opened simply acting to transfer all materials pumped by the pump 20C into the secondary tank 11 at the same density as the target density in the recovery tank.

When required at the batching plant, the slurry is pumped from the secondary tank 11 through the dilution management assembly 22 described below. For example, the density required to batch maybe set at a lower density such as 1.07 g/cm$^3$, although this may be set at different values depending upon the batcher's requirements, which will require a fresh water to slurry water blend of 1:1 if the reservoir density is 1.15 g/cm$^3$ to as much as 4:1 if the reservoir density is 1.30 g/cm$^3$, as described below.

In the embodiment of FIG. 1, the control unit 16 monitors and maintains the density of the system-water in the recovery tank 12 and the batch-slurry in the secondary tank 11 and delivers the batch slurry at a predetermined density to the batch plant, as described below. A Coriolis density meter 20 is installed on the slurry line to monitor the density of the batch slurry in real time in the re-circulation loop, as described below. As will be appreciated by one knowledgeable in the art, other suitable density meters known in the art may also be used. The density meter 20 feeds back to a PLC control system that will monitor and adjust the system settings to allow proper blending, as described below. An Operator Control Panel is installed at the batch station to allow the batcher to monitor the system and make periodic adjustments as may be required to reflect the changing needs of the user.

The dilution management assembly 22 in some embodiments is placed as close to the batch plant as possible. In one embodiment, the assembly sits atop a metal platform 50 that is approximately 10 to 12 feet in length and 4 to 6 feet in width. As shown in FIG. 1, the secondary tank 11 is connected to a batch slurry feed line 27 and a circulation loop 34. There is a "Y" valve 25 that allows the slurry feed line 27 and fresh water feed line 23 to flow into a common line 26, as described below. The common line 26 following the "Y" valve 25 is in one embodiment approximately 5 feet in length to allow the diluted batch slurry to settle from a turbulent flow to a laminar flow. The common line 26 is connected to the density meter 28, as shown in FIG. 2. Downstream pipe 29 exits the density meter 20 and is connected via pipe 27 to return valve 32 that leads to the secondary tank 11. The downstream pipe 29 is connected to a discharge valve 30 that allows the slurry to report to the batch water weigh hopper 14. In other embodiments, the batch slurry may be introduced into the batch process using a flow meter rather than a weigh hopper. It is of note that when the discharge valve 30 is open, the return valve 32 at the head of the return line to the secondary tank 11 closes. These two valves operate opposite one another, so that the return loop and the batch weigh hopper delivery line will remain independent, allowing the proper dilution to be established into the lop before the valve 30 is opened to allow the properly diluted slurry to flow to the batch tank 14.

In use of the first embodiment, before the commencement of operations on any given day or as required by the producer, the recovery tank 12 has added thereto an initial quantity of water and a corresponding amount of HSA. The principle of chemically stabilizing cement is based on the use of a carboxylic acid to suppress hydration activity for a defined period of time. This is accomplished by adding a specific quantity of HSA to a known quantity of water in which cement particles will be suspended for an established period of time. The purpose of the specific quantity of HSA is to stabilize the cement hydration for a finite period of time. In most cases, the cement will require stabilization for 12–24 hours. Further detail on the process of hydration stabilization can be found in the above mentioned technical document named "A Novel Method Of Recycling Concrete Using Extended Life Admixtures." Co-authored by Lawrence R. Roberts of W. R. Grace (Conn.) and Seiji Nakamura of K.K. Denka Japan, which was released at the European Ready-Mix Association congress in 1998. A transit mixer 22 backs to the rinse flume of the aggregate re-claimer 10 to discharge waste concrete remaining in the mixer drum of the transit mixer 22. The operator depresses a water delivery button at the aggregate re-claimer 10 that causes water from the recovery tank 12 to be pumped via, for example, a giraffe pipe into the transit mixer drum. The water and waste concrete is then mixed at high speed for a period of time, for example, two minutes, thereby forming an aggregate slurry. The aggregate slurry is then discharged into the aggregate re-claimer 10.

The aggregate re-claimer 10 removes all aggregate material larger than 150 microns from the washout, for example, by means of a gravity de-watering screw or trommel re-claimer, and discharges the aggregate into aggregate bunkers for eventual return to stockpile. Thus, reclaimed aggregates can be screened to their original classifications and returned to stockpile at full value. The aggregate re-claimer 12 is able to recover fines down to at least 150 microns or smaller, leaving a slurry with a cementitious to non-cementitious ratio of fines ranging from 70:30 to 90:10.

It is desirable to remove as much of the non-cementitious fines from the aggregate slurry as possible. Reduction of coarse and non-cementitious fines reduces abrasion wear, extending the life of the components of the concrete recovery system 1 and allows for more efficient use of chemical stabilizer and greater system capacity for storage of more valuable cement and fly ash.

The system water/slurry is then discharged to the recovery tank 12 until needed for subsequent washouts. A density meter 20 regularly reports the density of the system-water in the recovery tank 12 to the control unit 16. Based on the user's system settings, the control unit 16 may periodically add more water and/or HSA as the density of the system-water rises.

Thus, over the course of the production day, the density meter monitors the rise of solids in the slurry. If the percentage of solids rises above a preset limit, an additional draft of water will be pumped into the tank with a corresponding amount of HSA. As discussed above, the goal is to keep the density of the system-water at a target limit.

If high volumes of washout cause the system-water solids to continue to rise after the design volume capacity limit of the system has been reached, further HSA will be added according to the solids increase, but not water. This guarantees that the cement in the slurry will remain uniformly stabilized for the time that it is required to remain in storage.

When the production day is complete, the control unit 16 automatically transfers the slurry from the recovery tank 12 to the secondary tank 14. Alternatively, the user may choose a specific time or set of conditions when the control unit 16 will automatically transfer slurry from the recovery tank 12 to the secondary tank 14. When the batcher requests batch water for process mixing, it is drawn from the batch tank 14 instead of from a fresh water source. When the batcher asks the system to deliver slurry to the batch tank, water weigh hopper or through a flow meter to the batch process, the system 1 immediately begins a dilution cycle to reduce the density from the higher values in the secondary tank 11 to the lower values required at the batch plant. This is initiated by a real time density measurement to determine if the density is above or below the target value required, as described below. If the density exceeds the target value allowed by the batching process, the system 1 will instruct a fresh water valve 40 to open to begin diluting the batch slurry. As the valve 40 opens, the slurry line will begin to accept fresh water until the density reaches the target batch density, at which point the discharge valve 30 will open and the diluted batch slurry will be discharged to the batch tank 14, water weigh hopper or flow meter. When the appropriate amount of batch slurry has been delivered, the discharge valve 30 will close and the fresh water supply will be terminated. The batch slurry will then continue to circulate until the batcher calls for more dilute slurry to batch. It is of note that the slurry water is delivered to the batch plant at a controlled predetermined density, preset by the operator and programmed into the control unit 16. Solids in the batch slurry are compensated for, by adjusting mix designs to allow for reduction of fresh ingredients and addition of slurry solids.

It is of note that the slurry dilution cycle may be initiated by the batcher or by a tank level indicator in a batch tank 14 that asks the system 1 to automatically refill the batch tank 14 if it drops below a certain volume level. However that supply is always at the predetermined density due to the controlled inline dilution from the higher density of the slurry stored in the secondary tank 11.

The actual step by step procedure of diluting the stored batch slurry to batch density is as follows. When the batcher starts the slurry re-circulation loop, a re-circulating valve 44 is open and the meter valve 25 is closed, so that the batch slurry flows along a circulation loop 34 back to the tank 11. Next, the system 1 closes re-circulating valve 44 and discharge valve 30 and opens meter valve 25 and return valve 32. As a result of this arrangement, the batch slurry will pass through the dilution management assembly 22 for a period of time sufficient to determine the density and temperature of the batch slurry. Once density and temperature have been established, the system 1 will update agitator speed and sets the slurry transfer pump speed to reflect the rate that the undiluted slurry is delivered to the dilution management assembly 22. This rate is consistent with the ratio of blending that will be required to reduce the batch slurry from its storage density to the batch density. Once agitator and pump speeds have been set, the system 1 closes the meter valve 25 and the return valve 32 and opens the re-circulating valve 44. As a result of this arrangement, the batch slurry returns to re-circulating loop 34 and the system 1 awaits the next command from the batcher. When the batcher or the system 1 calls for batch slurry to be delivered to the batch tank 14 or flow meter, the system 1 closes the circulating valve 44 and the discharge valve 30 and opens meter valve 25 and return valve 32. The variable frequency drive on the batch-slurry transfer pump motor then increases or decreases pump speed to control the rate of slurry delivery to the dilution management assembly 22. For example, when using a peristaltic (hose) pump as a batch slurry transfer pump, the fresh water to batch slurry water ratio is determined by a system preset. For example, if the stored batch slurry in the tank has a density of 1.15, the system will require approximately a 1:1 ratio of fresh water to batch slurry water to dilute the batch slurry to 1.07. Therefore, if the batch slurry transfer pump is set to deliver 100 gallons per minute to the batch tank 14, the fresh water valve 40 will also deliver 100 gallons per minute, providing a total flow of 200 gallons per minute of batch slurry diluted to 1.07. In a different scenario, where the stored batch slurry in the secondary tank 11 is at a density of 1.30, the fresh water to batch slurry ratio will be 4:1, in which case the batch slurry transfer pump will be set to deliver 40 gallons per minute to the dilution management assembly 22, while the fresh water valve 40 will deliver 160 gallons per minute to the dilution management assembly. This will also provide a total flow of 200 gallons per minute of batch slurry diluted to 1.07. It is of note that in some embodiments, the batch slurry transfer pump will have not less than four possible speeds of slurry delivery to accommodate four different batch slurry densities. Small variations in batch slurry density between the set points will be compensated by real time adjustments in the fresh water flow rate. As the batch slurry and fresh water converge and flow into the density meter 20, the density of the diluted batch slurry is monitored and reported back to the system 1. If the density is above or below the batch target density, the fresh water valve 40 will open or close to bring the density into a target range, typically between 1.069 $g/cm^3$ and 1.075 $g/cm^3$ if the target density is 1.07 $g/cm^3$. Once the batch target density has been reached, the system 1 closes return valve 32 and opens discharge valve 30. This allows the batch slurry to report to the batch tank 14. The flow will continue until the batch tank 14 records a full reading and instructs the system 1 to return to re-circulation, or until the batcher has received enough diluted batch slurry in the weigh batch hopper 14 and instructs the system 1 to stop delivering batch slurry. Once the system has stopped delivery of batch slurry to the weigh batch hopper 14, the settings of the dilution management system 22 will be recorded in a PID loop that will instruct the system to return to its last known delivery settings the next time batch slurry is called to batch. This will reduce the time required to find the exact batch target density to a few seconds rather than 15 to 30 seconds.

If the system 1 requires hot water to compensate for cold weather aggregate temperatures, the dilution management system can use hot water as its fresh water feed source, eliminating the need to blend several water sources to arrive at a suitably blended batch slurry temperature and density, or can use a hot water heat source as shown in FIG. 1.

The primary function of the concrete recovery system 1 is to safely and efficiently recycle cementitious slurry water. In order to accomplish this, it is necessary to develop a consistent and carefully controlled method of incorporating slurry into the batching process. The key to accomplishing this is to maintain a constant regular density for all recycled slurry water. The in-line dilution and mixing process dilutes a stream of cementitious slurry with fresh water in flow, arriving at a target density that will be both consistent and reliable. This constant supply of slurry at a stable target density allows the ready-mix producer to use the slurry water as mixing water for manufacturing fresh concrete. Furthermore, the stability of the slurry density acts as a quality control constant, providing consistently similar performance characteristics of the fresh and hardened concrete.

Maintaining regular density allows the producer to develop mix designs for use of the slurry that are constant and reliable in both placing characteristics and final strengths. It also allows the producer to balance the amount of slurry accumulated over a given day with the amount distributed over the following day's production. This balancing of intake and outflow will assists in guaranteeing quality control. By eliminating the need to calculate the blending ratios, the system is as close to fail safe as can be expected. In this regard, the discharge valve 30 must remain closed until the density meter 20 reads that the diluted batch slurry density has reached the target range and is ready to be released. From a batcher's standpoint, the system frees him from having to modify mix designs to compensate for fluctuating densities, and practically eliminates the risk of liability associated with concrete failures due to error in compensatory calculations by the batcher.

Thus, the concrete recovery system is an aggregate re-claimer and slurry recovery system that operates on a closed circuit, zero-discharge principle, and can be implemented as a parallel system with any ready-mix batch plant. The system reclaims aggregates for re-use and recovers cementitious slurry for re-use as process mixing water, as described below. The system combines density management with chemical hydration stabilization in a self-monitoring and self-regulating storage and transfer environment. The fundamental goal of the system is to return the batch slurry to batch at a controlled density, allowing the cementitious solids in the batch slurry to be recovered as replacement material for fresh fly ash or cement.

In practical terms, when the batcher calls for batch slurry, it is delivered to the batch plant at the preset density. This density will correlate with the slurry-based mix design written into the batch computer. The underlying principle is to maintain exactly the same batching procedure as would be followed under normal circumstances. The only difference is that part of the cementitious material is supplied with the slurry, allowing the operator to reduce the cement and/or fly ash called for in the mix design.

For example, a normal Portland 25 MPa mix design calling for:

215 Kg cement

70 Kg fly ash

105 Kg fresh water

Could be replaced with a mix design calling for:

210 Kg cement

65 Kg fly ash

116 Kg slurry at a density of 1.07

In another configuration for example, in which the concrete producer chooses to simply dispose of the cementitious slurry solids in the fresh concrete batches, he may choose not to modify the mix designs, but rather let the slurry solids be added to the fresh mix in addition to the normal distribution of the constituent ingredients and allow the final strength to be over-designed and the benefit to carry forward to the concrete purchaser.

In all other respects, the mix design would be identical to a normal production design, and since the cement slurry is stabilized, it will not affect other admixture relationships in the fresh batch such as air entrainment.

Turning now to the second embodiment shown in FIG. 2, this is modified from the first embodiment by a number of features, the primary one of which is that the control of the dilution of the batch slurry to the required density occurs between the primary tank and the secondary tank so that the required amount of batch slurry for a period of use, typically one day or one production cycle, is stored in the secondary tank at the required density and can be supplied at that density on demand to the batching system. Thus an additional fresh water line 38A from the supply 38 is connected through a valve 38B to the output from the pump 20A for mixing with the slurry from the tank 12. The return loop 34A for establishing the required dilution is formed through the irrigation valve 20D following which the valve 20D is closed and the valve 30 opened to transfer the accurately diluted slurry to the secondary tank 11. Transfer from the tank 11 to the batch tank 14 is effected through valves 53 and 51 and pump 52.

The following is a detailed description of the second embodiment, which may repeat some aspects which are common to both embodiments.

The trucks will receive system-water for drum rinsing through giraffe transfer pipes 20F and valve 20E at each truck station. They will discharge the waste concrete mixture or aggregate and slurry into an intake flume with internal rinse irrigation. The flume will provide for quick discharge of aggregate and slurry and controlled feed into the re-claimer. The coarse aggregate is classified out of the drum contents by means of a 36"×25' spiral-classifier and discharged into a storage bunker, while the cement, low-density fines and water flow into the primary tank in slurry form.

The principal storage and transfer component of the system are: two API 650 storage tanks 12 and 11 mounted on a rigid skid-frame 50 located at the washout transfer station and one (1) batch tank 14 located at the plant. The system is delivered as a complete unit ready for use, with operating components fixed to the skid-frame. It may be installed quickly and efficiently without disrupting plant operations.

The API 650 tank capacities can be expanded with flanged sections to extend nominal tank height from a base design of 9'6" up to 14'6" or even as high as 19'2". The tanks 11 and 12 are fitted with agitators 26 to maintain controlled homogeneity of the contents. The three standard tanks are designated as follows:

The recovery tank 12 holds a maximum 34,500-liter volume of system-water containing a hydration stabilization admixture (HSA). This system-water circulates through the washout transfer station and re-claimer providing rinse water for the trucks 22 and irrigation water for the re-claimer 10.

The secondary tank 11 holds a maximum 55,250-liter volume of batch slurry in temporary storage until it can be re-used as mixing water in fresh concrete production.

The 1,720-liter batch tank 14 automatically receives batch slurry from the secondary tank to maintain a just-in-time volume of batch slurry for use in fresh concrete mixes as required by the batcher. The recycle water port on the batch computer actuates the discharge valve on the batch tank.

The process equipment and system instrumentation is mounted on the skid and/or affixed to the tanks as required. This includes the following:

All tanks are fitted with agitators 26 and tank baffles to keep solids in proper suspension. The agitators are hydrofoil-impellers that provide maximum homogeneity with minimum shear abrasion.

The primary pump 20C delivers system-water to the truck drums 22 for rinsing and irrigates the re-claimer 10 and flume 8 to wash the waste concrete mixture into the system. The primary pump 20C transfers system-water from the recovery tank 12 to the secondary tank 11.

The secondary pump 52 delivers batch-slurry from the secondary storage tank to the batch tank at the plant for use as mixing water in fresh concrete.

An in-flow density meter 20 monitors system-water/batch slurry density and temperature. The information is used to control system-water/batch slurry density and temperature management and the transfer-dilution process.

A service 38 for fresh water addition is mounted to the skid-frame 50 consisting of a flow meter and automated control valve.

All piping and fittings are schedule 40 with long radius elbows to reduce abrasion. All process control valves are high quality, 150-p.s.i.-rated pneumatic pinch valves with replaceable rubber sleeves.

All tank volume levels and high-low signals are monitored and reported to the system controls by an ultrasonic level sensor and transmitter 60. This gives the batcher a visual graphic and corresponding numeric value at the batch plant indicating the volume and level in each tank and triggers automated system activities.

The recovery tank monitors temperature at the density meter 20, while the secondary tank is fitted with a thermal sensor 61 to monitor batch slurry temperature. These sensors can be used to interface with a heat exchanger or other variety of heating or cooling system (not shown).

A chemical addition system 18 automatically injects HSA into the system-water and is designed to feed chemical into both tanks as the system demands.

The dilution management system uses fresh or process water to dilute the recovery tank system-water to a constant density in transfer to the secondary tank, thereby guaranteeing a stable supply of batch slurry in the secondary tank at the density required to batch without manual calculation or risk of error.

The system management controls package ties the process equipment and controls into an integrated automation system. The system monitors, controls and maintains the system-water/batch slurry in storage and delivers it at a predetermined density to the batch plant.

An operator control panel (OCP) 16 is installed at the batch station to allow the batcher and quality control personnel to monitor the system and make periodic adjustments as may be required to reflect the changing needs of the producer.

When batching with batch slurry, the goal of the system is to provide the batcher with a stable supply of batch slurry at a constant density and also a constant temperature as required by the producer. This allows the batcher to use most existing batch computers to adjust or modify the final batch outcome.

If the user wishes to increase secondary storage density and dilute the slurry in the weigh hopper, the batch computer can be preset to add make-up water to a draft of recycled water to reduce density at the weigh hopper. This method expands the storage capacity of the system by allowing the secondary tank to store more slurry solids.

For example, if the storage density in the secondary tank and transfer circuit were set at 1.10 g/cm$^3$, the batch computer could be set to automatically add make-up water to the slurry in the weigh hopper to reduce its density to 1.07 g/cm$^3$ by splitting the feed of slurry in ratio to fresh water at 1:0.6 or 60% slurry and 40% fresh water.

In winter batch-slurry can be stored at a relatively high density and at low temperature and diluted with hot water in the batch weigh hopper. This can be used to elevate batch-slurry to high temperature seconds prior to delivery, allowing heating of the slurry without propagating hydration across the stored volume in the secondary tank or allowing high-temperature initiated hydration to continue long enough to have any noticeable effect on the fresh concrete.

The low temperature storage reduces the amount of chemicals required as hydration is temperature dependent. In the alternative, the mixing with hot water can be combined with the dilution step.

Each washout station is fitted with a 3"-diameter, giraffe-style overhead water-transfer pipe to deliver system water to the mixer drum. Each giraffe assembly is fitted with a user switch box with two (2) safety designed, all-weather push buttons, an open/close pinch valve and a flow meter. The start buttons will be clearly marked FULL RINSE and CHUTE RINSE.

The wash stations are positioned along a common collection flume into which the waste concrete mixture is discharged. A fresh-water hose will be mounted at each giraffe to facilitate manual truck chute rinsing. HSA will be injected into this rinse hose to maintain overall chemical balance during un-metered additions of rinse water (i.e. rinsing chutes and truck components).

Depressing the Full Rinse button will initiate delivery of a draft of system-water from the recovery tank to the truck drum. The draft quantity is user-defined (nominal 1000 liters). The chemical present in the slurry will coat the truck drum, aiding resistance to build-up of waste concrete. System-water will dilute the waste concrete mixture, making it flow-able and easily discharged. The end of the drum transfer cycle will initiate an irrigation cycle. Irrigation cycle time is user-defined (nominal 16 minutes). System-water conditions will be monitored during the irrigation cycle allowing system settings to be updated. If a full rinse cycle is in progress when a new driver depresses the Full Rinse button at his particular station, the system will restart the cycle.

Depressing the Chute Rinse button will initiate an irrigation cycle without a drum transfer by controlling the valves 20D and 20E.

Irrigation cycle time is user-defined (nominal 3 minutes). A rinse hose will provide chemically treated fresh/process water to rinse chute washout into the re-claimer. System-water conditions will be monitored during the irrigation cycle, allowing system settings to be updated. If a full rinse cycle is in progress when a new driver depresses the Chute Rinse button, the system will restart the cycle.

As multiple-serial transfer valves open or close, line pressure will rise and fall. The system senses the pressure change and adjusts the primary pump 20C speed and flow rate to maintain a constant transfer flow rate regardless of the number of open valves. This will guarantee constant transfer times. The Full Rinse button starts the primary pump, opens the giraffe valve and delivers 1000 liters of system-water to the truck drum. When the drum transfer flow meter registers the complete transfer of system-water, the giraffe valve will close and the irrigation valve for the re-claimer will open. The re-claimer begins operation when irrigation valve opens. The irrigation system runs on a timer for 16 minutes and then automatically shut down the primary pump and re-claimer when the cycle is complete.

The Chute Rinse button starts the primary pump 20C and the re-claimer without transferring system-water to the truck drum. The Chute Rinse button initiates a 3-minute rinse cycle through the re-claimer irrigation system. The end of the rinse cycle will cause the re-claimer and pump to shut down.

The operation of the re-claimer and flume will always be in conjunction with irrigation flow provided by the primary pump. Flow will be divided amongst the flume and re-claimer at a nominal flow rate of 600 liters per minute.

For example, a spiral-classifier, which employs a rising current classifier provides for efficient removal of low-density cementitious and sand fines while allowing heavier aggregate to sink to where the spiral can remove it from the re-claimer. A wash back channel in the spiral-classifier provides further irrigation by rinsing the spiral channel to keep it clear of accumulated fines.

The intake flume is fed with system water through rinse piping that will flush the waste concrete mixture into the re-claimer. The primary pump feeds the flume to maintain material recovery and separation at optimum efficiency.

The recovery tank has three principal functions. They are:
- a reservoir for system-water used to irrigate on the re-claimer and provide rinse water for the trucks;
- collection and storage vessel for cementitious and sand fines collected in the washout process; and,
- the point of chemical stabilization for incoming cementitious material.

The recovery tank has a nominal volume of 34,500 liters or 9,100 U.S. gallons. It is fitted with a ULI and an in-flow density meter in its irrigation piping.

The recovery tank and re-claimer circuit have three possible operating modes. The parameters are user specified to reflect the needs of the producer. The modes are:

Target-Density Mode (TDM)—In TDM, the nominal density of the system-water ranges between 1.00 to 1.15 $g/cm^3$., and the system strives to maintain minimum volume at a constant density near the high end of that range. As solids enter after the high end of the range has been reached, dilution water and hydration stabilization admixture will be added to the tank at the pre-calculated ratio determined by the target density and the temperature to reduce the system-water density below the high end of the range and maintain the proper chemical/water ratio.

High-Density Mode (HDM)—In HDM, the nominal density of the system-water may rise as high as 1.30 $g/cm^3$ In HDM, the system disallows addition of fresh dilution water, but allows addition of HSA in proportion to temperature and density. Solids continue to be accepted by the system during HDM, but the system requests the batcher to transfer system-water to the secondary tank to allow return to TDM.

Sleep Mode (SM)—SM can be initiated by the batcher or automatically at a preset time. SM will start a system clock to monitor the age and temperature of the slurry with user-defined, periodic 3-minute irrigation cycles and timed system commands. The primary function of SM is age monitoring and HSA addition, which is tied to temperature changes in the system-water and batch slurry or a preset elapsed time limit on the system clock. If sleep mode continues unbroken for the length of the preset timed-cycle, the system will add chemical according to the volume, temperature and density of the system-water and/or batch slurry, and return the preset timer to zero to begin a new cycle. In SM, a gate valve 53 between the secondary tank and the batch tank will close, preventing slurry solids form migrating into the secondary transfer pump casing and also acting as a security precaution against spillage in the event of a seismic event. Furthermore, the isolation of the secondary transfer line from the secondary tank will allow the secondary transfer line to be purged with fresh water and then drained to prevent pipe rupture or unnecessary accumulation of solids in the transfer line during long system-idle periods.

The fill cycle is automatic with manual override. Flow meter monitors the fresh water inflow volume. HSA is added automatically with fresh water at the pre-calculated ratio. Re-fill of the tank is triggered by low-level signal.

The control of the recovery tank transfer process may be done manually as required. If the transfer causes complete evacuation of the recovery tank, the end of the transfer cycle will trigger the beginning of a new fill cycle. When the tank level drops below a preset minimum, the system may automatically dilute and transfer the remainder of the recovery tank 12 contents to the secondary tank 11 or, alternately, trigger a warning signal to inform the batcher to transfer the remaining volume manually at the batcher's convenience.

The system monitors system-water density and temperature condition during each irrigation cycle. In SM, a periodic user-defined irrigation cycle monitors and corrects system-water condition. Dramatic changes in conditions can trigger alarms to notify service personnel.

The system controls operation of an HSA system to inject chemical to the recovery tank as required. In TDM, HSA is added in ratio to fresh water inflow volume, temperature adjusted between 4° C. and 38° C. In HDM, HSA is added in ratio to system-water density and the measured volume of the recovery tank, temperature adjusted between 4° C. and 38° C. In SM, HSA is added in ratio to density in the measured volume of the recovery tank, adjusted by slurry temperature between 4° C. and 38° C.

For Storage Target Density & Dilution, the density meter has a readout to four decimal places. Target density setting is adjustable from 1.0000 $g/cm^3$ to 1.3000 $g/cm^3$. The target density setting has a threshold of one digit in the second decimal place above and 2 digits below the target density (e.g. If target density is 1.1500, dilution commences when the density reaches 1.1600 and ceases when density drops to 1.1300 or below). The system will not dilute until the recovery circuit is idle. System locks out washout station and re-claimer during dilution.

The system is arranged to provide a Transfer Target Density and to effect Dilution from that target density during transfer from the tank 12 to the tank 11, for this purpose, recovery target storage density will always be higher than secondary target batch density. This will always require some degree of dilution as slurry is transferred from the recovery to the secondary tank. As the transfer cycle begins, the system will check the slurry density in the transfer line and begin to introduce fresh dilution water to reduce the storage density in-flow to the batch density. The transfer valve 30 will open at the target batch density and allow batch slurry transfer to the secondary tank. Storage density and batch density can be user-defined.

In the fill cycle, when the ULI senses that the recovery tank 12 volume has dropped to its minimum level, an automatic refill cycle will commence if the last recorded density measurement is above 1.10 $g/cm^3$. The cycle will begin with a purge transfer of the final volume in the recovery tank. The procedure is as follows. The system will check the level in the secondary tank 11 to ensure there is sufficient capacity to accept the final transfer. If capacity is sufficient, slurry will be diluted and transferred to the secondary tank and refill will commence. If capacity is insufficient, the system awaits override by the batcher or notice of available capacity from the secondary tank ULI. While the system is awaiting override or notice, a transfer/purge signal flashes on the OCP screen to notify the batcher of the impending transfer.

When capacity becomes available, dilution-transfer and refill will commence. The batcher can manually dismiss the transfer notice and return the recovery circuit to normal operation. This manual-dismiss command will cause addition of fresh water and a corresponding quantity of chemical to bring the recovery tank volume to a preset level above the minimum level. Each time the recovery tank volume drops below the preset level it will trigger a transfer notice.

During the final volume dilution and transfer, the ULI monitors the tank levels. When the volume remaining in the tank reaches 100 gallons, the density measurement and dilution will cease. The secondary transfer line will remain open and the pump will, for example, continue to transfer for 60 seconds. Fresh water induction valve commences refill process. When the period ends, the transfer valve closes and the pump stops, but the fresh water service continues to fill the tank. Flow meter commences to measure fresh water inflow. The flow meter will totalize the fresh water volume inflow until the recovery tank reaches the preset minimum metered volume at which time the fresh water fill valve will close. The closing of the fresh water fill valve will trigger the start of a 3-minute chute rinse irrigation cycle. The irrigation cycle will allow the system to determine density and temperature. The temperature and metered water volume determine the amount of chemical added to the fresh water. The density measurement resets the agitator speed. The rinse cycle ends switching off the pump and closing all recovery and transfer valves.

The Agitator 26 speed is controlled by the PLC to correlate system-water density with impeller speed. As the density fluctuates, so does agitator speed. The agitator 26 will automatically switch off when the level in the tank drops below a preset limit. Conversely, when the level rises above the preset limit, the agitator will recommence operation.

A dilution cycle begins when the density in tank 12 rises 0.01 g/cm$^3$ above the target setting. The re-claimer and wash station valves 20D and 20E are locked out. The system transfers 2000 liters of fresh water into the tank. Chemical is added at the pre-calculated ratio according to volume and temperature of fresh water. The addition of chemical is recorded and totalized. A chute rinse cycle will commence to measure density. If density is below 1.13 g/cm$^3$, system moves to next step. If density is above 1.13 g/cm$^3$, system adds more dilution water and chemical. Dilution sequence repeats until the desired target density is reached. The re-claimer and wash station valves 20D and 20E will be unlocked.

When the ULI senses that the recovery tank has reached maximum allowable volume at the target storage density, recovery tank controls will switch to HDM. Switching to HDM mode will commence a transfer-warning signal at the OCP to advise the batcher to transfer a quantity of system-water to create capacity in the recovery tank for further dilution and addition of washout solids. The transfer warning will continue until the batcher transfers enough volume to the secondary tank to terminate the HDM. In HDM, dilution water is no longer added as density rises. The system monitors density and temperature during HDM and adds chemical according to an HDM I chemical addition scaling function. This will automatically determine the amount of chemical to be added according to the density modified by temperature.

As required by the batcher, system-water is transferred to the secondary tank in quantity sufficient for the batching requirements for the period concerned, which may be daily/hourly and the system-water then becomes batch-slurry. The batcher inputs a transfer quantity into transfer screen on OCP. The transfer command is initiated, causing the system to lockout all other functions. The primary pump 20C starts, allowing the density meter to read the system-water density and commence dilution. The fresh water valve 38B will open until the density measured by the density meter reaches the target batch-slurry density. The transfer valve will open causing the dilute batch-slurry to be transferred into the secondary tank. The transfer will continue until the volume transferred reaches the quantity input by the batcher in step 2 above.

The transfer valve closes and the system returns to idle.

When the batcher requires system-water to be transferred to the secondary tank for storage as batch slurry, the dilution-transfer command will allow controlled density system-water to be transferred from the recovery to the secondary tank. The secondary tank 11 will store and monitor the condition of the batch-slurry in the secondary stage before it is sent to the batch plant for use as mixing water. Volume and capacity are monitored and displayed at the OCP. Temperature and density are monitored and displayed at OCP. Batch slurry age is monitored while system is in sleep mode.

The transfer pump delivers the batch-slurry to batch tank. Transfer is automatically initiated by the level indicator in batch tank.

For Hydration Stabilization, a user-defined slurry-age timer counts down to re-dosage when the system is in sleep mode. HSA is added automatically to prolong the cementitious life of the batch slurry and prevent hydration from recommencing.

The batch tank holds a just-in-time volume of batch-slurry for delivery to the weigh hopper at the batch plant. The batch tank has an agitator to keep solids in suspension. The batch tank has a ULI to monitor tank batch-slurry volume. The batch tank refills automatically when volume drops below a preset level. The recycled-water port on the batch computer controls the batch tank discharge valve.

The density of the batch-slurry in the secondary tank will control the agitator speed. The system will use the target batch density setting to control agitator speed. The batch tank agitator will be constant speed. When the level in either the secondary or the batch tanks drop below a preset limit, the agitator will automatically switch off. Conversely, when the level rises above the limit, the agitator will recommence operation.

The ULI continuously relays volume in the tank to the PLC. The program continuously calculates available tank capacity. Internal clock monitors the age of the batch-slurry from the time the system switches to sleep mode. When the tank volume drops below a pre-set point the secondary circuit is disabled including operation of the secondary transfer pump.

If the system is in SM when the clock reaches its re-dosage point a command to add HSA is executed. HSA is added in ratio to the target batch density in the measured volume of the secondary tank adjusted by batch-slurry temperature between 4° C. and 38° C. The real time slurry age clock is reset to zero, counting down to another dosage. This can be repeated a preset number of times defined by the user.

When the batcher activates the transfer circuit, the transfer pump 52 delivers a quantity of batch-slurry from the secondary tank to the batch tank. The ULI in the batch tank informs the system when the batch tank has filled to a preset maximum level and the system shuts-off the transfer pump. Each time the batch tank calls for batch-slurry, the secondary transfer pump 52 automatically commences transferring.

When the batcher terminates the use of the transfer circuit, the refill command at batch tank is disabled. The system automatically commences a purge cycle. The purge cycle demands the evacuation of the batch tank and closure of the gate valve 53 on the secondary tank. The ULI will terminate the agitator operation when the batch tank level drops below a preset level, and when the ULI at the batch tank reads that the batch tank is empty, a purge cycle will commence. Fresh water valves (not shown) open in the transfer line for a preset time, allowing the line and pump 52 to be purged with fresh water. Batch slurry is displaced from the transfer pipe and pump casing into batch tank 14 by fresh water. When purging is complete, the system may be set to SM.

The system can monitor and control the temperature of the slurry by activating an optional heat transfer unit (not shown) mounted in the recovery and/or secondary tank. This heating system will raise the temperature of the system-water or batch-slurry from ambient temperature to the required batch temperature. A temperature sensor is mounted in the secondary tank to monitor slurry temperature. The density meter in the recovery tank also monitors slurry temperature. The PLC controls the heat exchange unit(s). The system has a temperature management program to sense and adjust temperature automatically. Batch-slurry is kept at a temperature that balances efficiency of hydration stabilizer usage and cost of BTU's. Batch-slurry temperature can be raised as it is weighed into the batch by blending with high-temperature water.

If the producer requires temperature control, optional in-line heat exchangers or in-tank baffle-style heat exchangers may be employed. If the slurry temperature drops below or rises above the setting defined by the producer, the heat exchanger(s) will commence operation. The system tracks the recovery tank system-water temperature at the density meter waiting for it to exceed the preset temperature minimum or maximum. The system tracks the secondary tank batch-slurry temperature with a thermal sensor waiting for it to exceed the preset temperature minimum or maximum.

Each time the volume in the batch tank 14 drops below a preset minimum, the secondary transfer pump 52 will start delivery of slurry from the secondary tank. When the secondary tank 11 drops below a preset minimum volume, the transfer command from the batch tank will be disabled. The secondary batch transfer circuit will not be locked out, but the batcher will be notified by a red flashing icon that the batch-slurry is not yet up to temperature. The recovery transfer circuit will function regardless of temperature. When the batch-slurry reaches temperature, the flashing icon will turn green to signal that operating temperature has been reached. The batcher may now transfer the batch-slurry to batch. The heat exchanger(s) will raise/lower the temperature of the batch-slurry in the tank(s). When the slurry is 5° C. over/under the system prescribed temperature the heat exchanger will be disabled.

While the preferred embodiments of the invention have been described above, it will be recognized and understood that various modifications may be made therein, and the appended claims are intended to cover all such modifications which may fall within the spirit and scope of the invention.

What is claimed is:

1. A method of recycling waste unset concrete materials containing water, aggregates and partially hydrated cement, the method comprising:
   providing a recovery tank;
   introducing into the recovery tank water and hydration stabilization chemicals to provide system water including a mixture of water and the hydration stabilization chemicals;
   providing a plurality of transit mixer drums, each containing of waste concrete;
   for each transit mixer drum:
      transferring from the recovery tank a portion of the system water from the recovery tank into each transit mixer drum;
      mixing in the transit mixer drum the waste concrete and the system water thereby forming an aggregate slurry;
      transferring the aggregate slurry into an aggregate re-claimer so as to separate the aggregate slurry into aggregates and slurry;
      and transferring the slurry to the recovery tank to mix with the system water to form a batch slurry;
   providing a slurry supply system of a batching slant for supplying the batch slurry in the recovery tank to a concrete batching plant for use of the batch slurry in mixing with aggregates and cement to form fresh concrete in the batching plant;
   and transferring the batch slurry from the recovery tank to the slurry supply system for use of the batch slurry;
   wherein separate portions of batch slurry from the recovery tank are transferred to the slurry supply system through a transfer duct for use of each portion of the batch slurry at the slurry supply system;
   and wherein each portion has the density thereof measured at the transfer duct and, if necessary, changed in the transfer duct, such that each portion is supplied to the slurry supply system at the same constant density.

2. The method according to claim 1 wherein the batch slurry from the recovery tank is maintained at a target density higher than the constant density and is mixed with dilution water in the transfer duct to reduce the density of the batch slurry from the recovery tank to the constant density.

3. The method according to claim 2 wherein the diluted batch slurry is stored in a secondary tank.

4. The method according to claim 3 wherein a batch of the diluted slurry is stored in a secondary tank, from which smaller individual quantities are drawn for the slurry supply system.

5. The method according to claim 2 wherein a rate of supply of the dilution water is increased up to a required rate at which said constant density is reached whereupon the rate of supply of dilution water is maintained constant at the required rate.

6. The method according to claim 5 wherein said required rate of supply is stored for subsequent transfer of slurry.

7. The method according to claim 5 wherein the batch slurry is returned to the recovery tank from the transfer duct until the constant density is reached and is then transferred.

8. The method according to claim 1 wherein further quantities of the water and of the hydration stabilization chemicals are added periodically to the recovery tank water to add to the system water therein and wherein there is provided a sleep mode in which it the slurry is to be left in storage for a period of time equal to or greater than a working period, in which mode a further quantity of the hydration stabilization chemicals is added without additional water at an amount dependent upon the time period beyond the working period.

9. The method according to claim 1 wherein the slurry supply system includes a batch tank arranged to store a batch of the slurry substantially equal to or greater than a required batch for the batching plant.

10. The method according to claim 9 wherein the batch tank has a discharge for supply to the batching plant which discharges the batch slurry at a rate greater than a rate of supply thereto.

11. The method according to claim 9 wherein there is provided a secondary tank dimensioned to hold a quantity of the slurry equal to or greater than a series of batches of the batch tank for use of the batch tank repeatedly during a work period and wherein the secondary tank is filled with diluted batch slurry from the recovery tank.

12. The method according to claim 1 wherein the batch slurry is stored at a first temperature and is mixed with hot water to raise the temperature at or prior to the batching plant.

13. The method according to claim 12 wherein the batch slurry is diluted with hot water to effect heating and to effect reduction in density.

* * * * *